Figure 4:
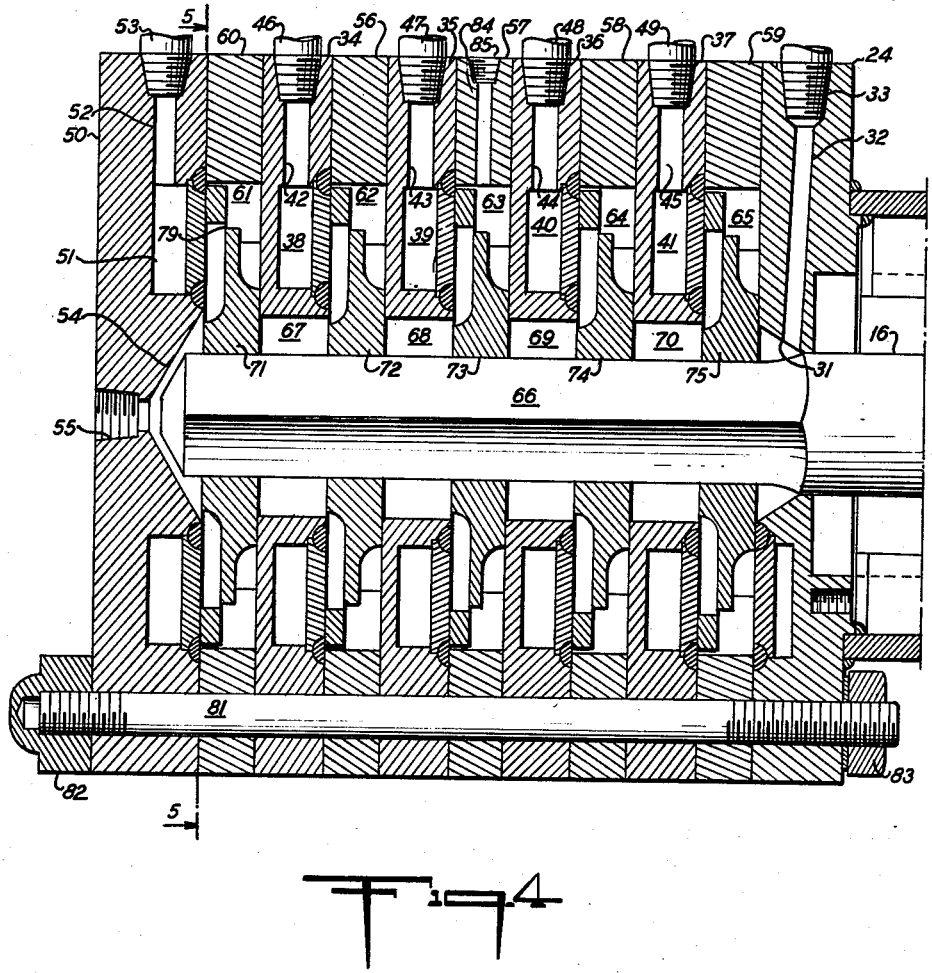

July 12, 1960
J. MARCO
2,944,877
CHEMICAL APPARATUS FOR CONTINUOUS REACTIONS, HEAT
EXCHANGE, MIXING, COOKING AND
OTHER CHEMICAL PROCESSES
Filed Aug. 26, 1957
7 Sheets-Sheet 1
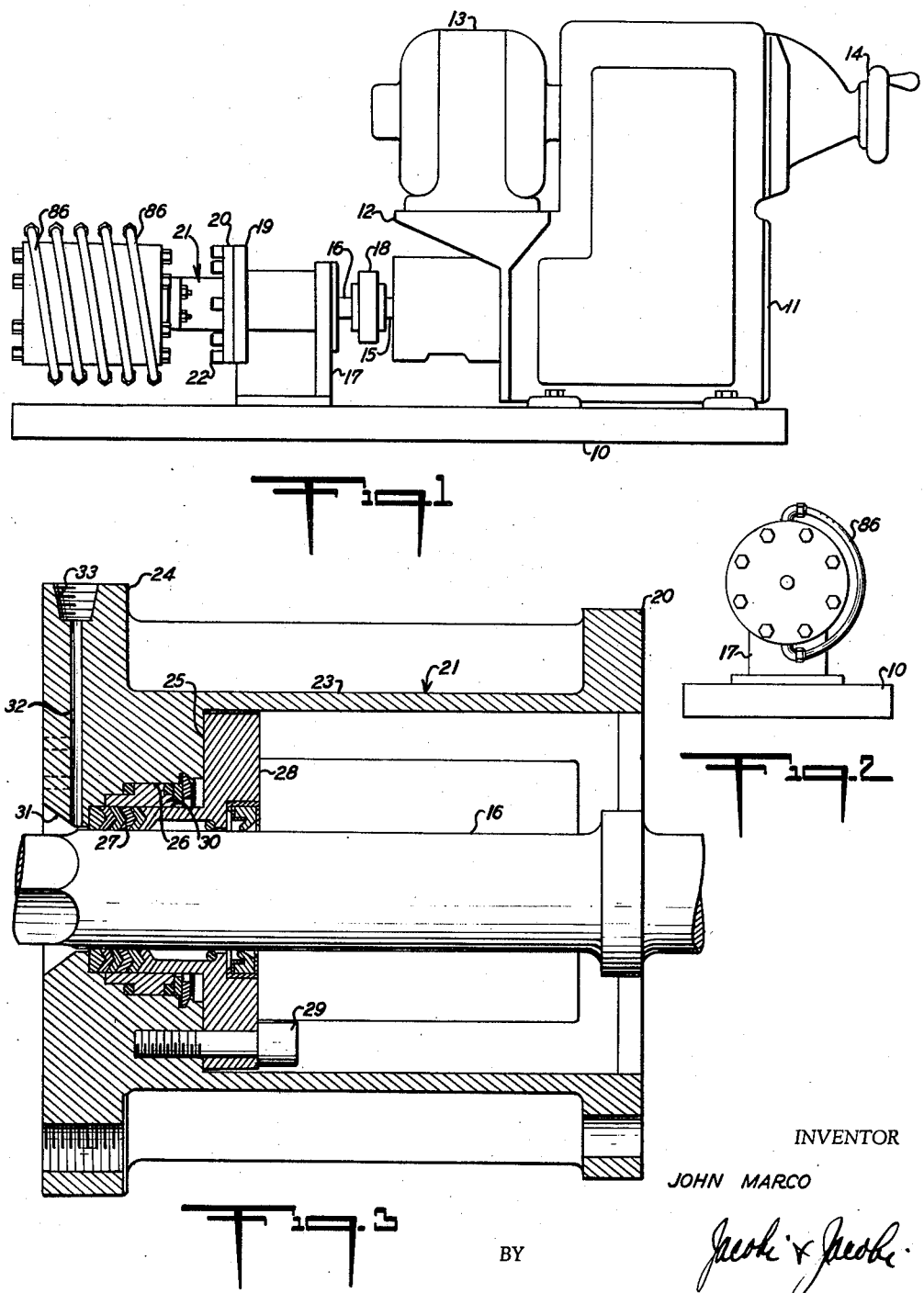
INVENTOR
JOHN MARCO
BY
Jacobi & Jacobi
ATTORNEYS

INVENTOR
JOHN MARCO

July 12, 1960 J. MARCO 2,944,877
CHEMICAL APPARATUS FOR CONTINUOUS REACTIONS, HEAT
EXCHANGE, MIXING, COOKING AND
OTHER CHEMICAL PROCESSES
Filed Aug. 26, 1957 7 Sheets-Sheet 3
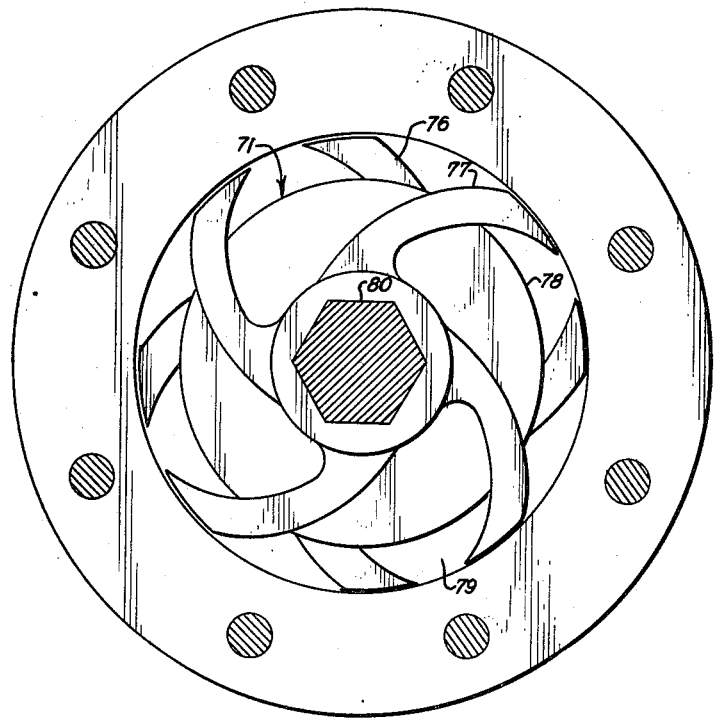
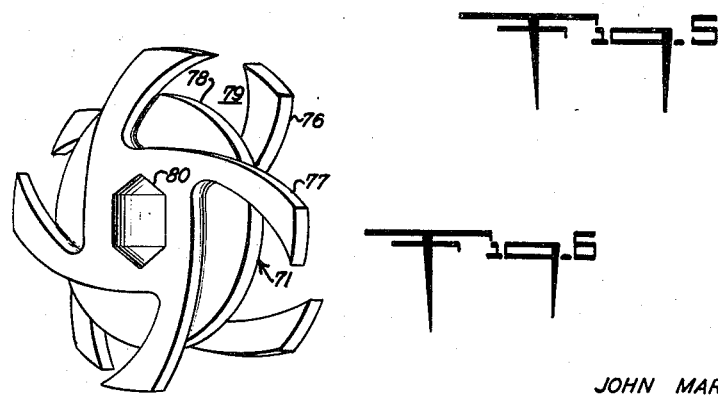
INVENTOR
JOHN MARCO
BY
ATTORNEYS

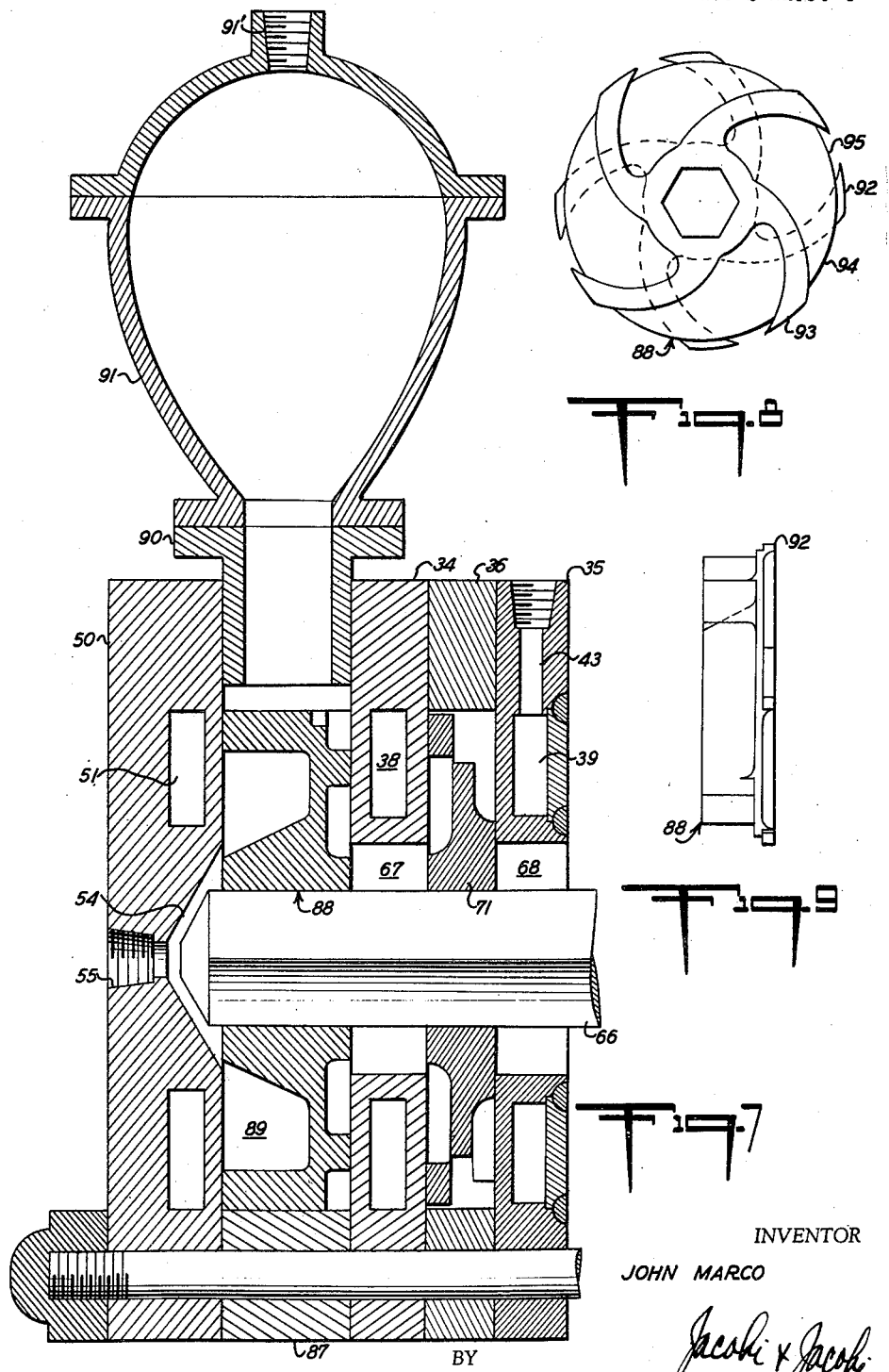

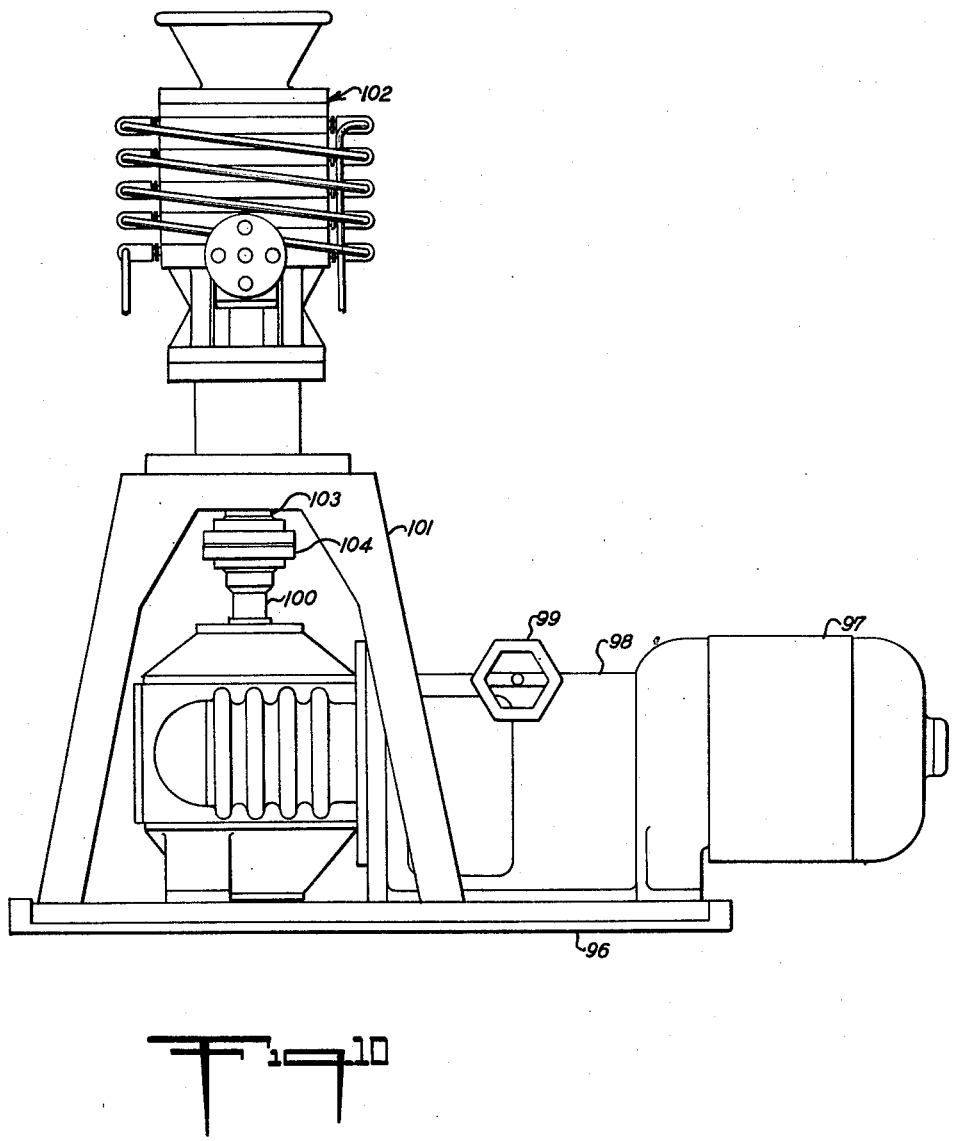

July 12, 1960     J. MARCO     2,944,877
CHEMICAL APPARATUS FOR CONTINUOUS REACTIONS, HEAT
EXCHANGE, MIXING, COOKING AND
OTHER CHEMICAL PROCESSES
Filed Aug. 26, 1957     7 Sheets-Sheet 7
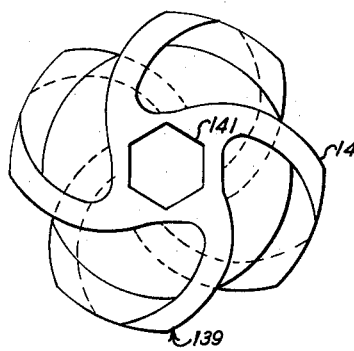
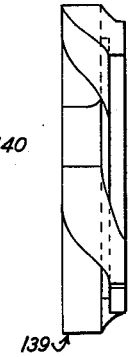
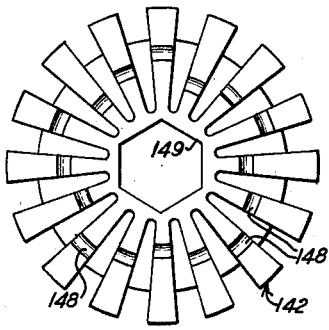
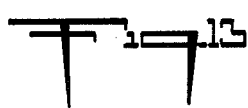
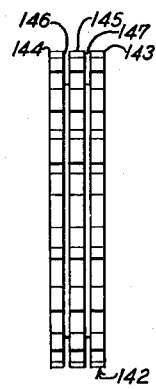
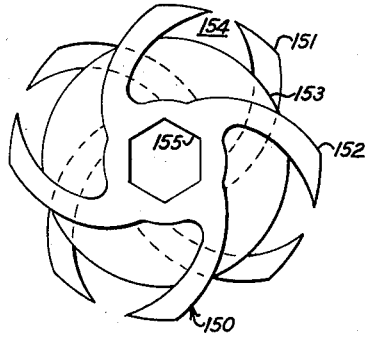
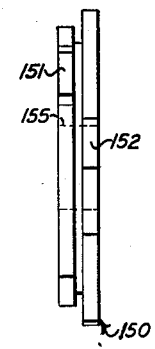
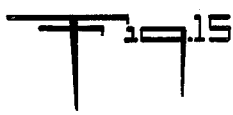
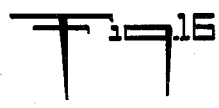
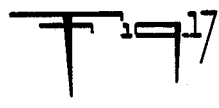
INVENTOR
JOHN MARCO
BY
ATTORNEYS : 2,944,877
CHEMICAL APPARATUS FOR CONTINUOUS REACTIONS, HEAT EXCHANGE, MIXING, COOKING AND OTHER CHEMICAL PROCESSES John Marco, 815-25 W. 5th St., Wilmington 1, Del.

Filed Aug. 26, 1957, Ser. No. 680,147

18 Claims. (Cl. 23—290.5)

This invention relates to chemical apparatus and more particularly to an apparatus for facilitating continuous reactions, heat exchange, mixing, cooking and other chemical processes in which it is necessary to maintain accurate and continuous control of the product during such processing and in which it is also advantageous to be able to add or withdraw heat at various stages of the process.

Heretofore, numerous types of continuous reactors have been proposed and utilized, but many of these were unsatisfactory due to the inability to maintain accurate heat control at various stages of the process and further due to short circuiting and harboring of the product in isolated locations which resulted in an inferior product and furthermore these prior art machines were relatively difficult to disassemble and clean and it was furthermore necessary to design and construct each machine for a particular specific process whereas in the machine of the instant invention, a wide variety of processes utilizing different types of products may be carried out.

As an example, the apparatus of this invention may be utilized in processes involving alkylation, cyclization, modulation, esterification, saponifications, oxidation, polymerization, co-polymerization, fusions, acetylations, sulfanations and numerous other chemical processes, it being only necessary to operate the apparatus and the controls provided therefor in such a manner, as to properly carry out these processes. Furthermore, the apparatus of this invention may be constructed in a relatively small size as laboratory equipment and after operation of the same to test a particular process, a production size apparatus may be constructed merely by reproducing the laboratory apparatus to a larger scale. This is occasioned by reason of the design which permits enlargement thereof without in any way changing the operating characteristics of the apparatus.

It is accordingly an object of the invention to provide a chemical apparatus which may be conveniently manufactured in a relatively small size for laboratory use and thereafter reproduced to a larger scale for production use.

A further object of the invention is the provision of a chemical apparatus in which the product is mixed and treated in a succession of chambers in which the product is exposed to heat exchange surfaces in relatively thin films thereby promoting extremely rapid heat exchange.

A still further object of the invention is the provision of a chemical apparatus in which additives may be incorporated in the product during any desired phase of the process.

Another object of the invention is the provision of chemical apparatus for continuous reactions and the like and in which all possibility of fouling or short circuiting of the product during reaction is eliminated.

Another object of the invention is the provision of a chemical apparatus for continuous reactions utilizing a plurality of chambers with an impeller disposed in each chamber, such impeller serving to agitate the product for mixing purposes and also to operate as a pump for controlling product flow through the apparatus and at the same time, maintain the product in a desired film thickness in contact with the heat exchange walls of the chambers.

A further object of the invention is the provision of chemical apparatus for continuous reactions utilizing a plurality of chambers with an impeller disposed in each chamber and a drive shaft for the impellers with such shaft being provided with a polygonal cross section to engage polygonal apertures in the impellers to drive the same thereby eliminating keyways which eliminates the harboring of portions of the product at various locations in the apparatus.

A still further object of the invention is the provision of a chemical apparatus for continuous reactions utilizing a plurality of chambers and an impeller disposed in each chamber and in which heat may be either added or withdrawn from the walls of each chamber thereby accurately controlling the temperature conditions of the product in that chamber.

A further object of the invention is the provision of chemical apparatus for continuous reactions utilizing a plurality of chambers with impellers disposed in such chambers and in which such impellers provide a pumping action to move the product through the apparatus and in which such impellers may operate as metering means for determining the quantity of product being processed.

Another object of the invention is the provision of chemical apparatus for continuous reactions in which an outlet for condensate vapor may be provided at any point in the process and in which the apparatus is of such nature that the escape of solids in the condensate vapor is materially reduced.

A further object of the invention is the provision of chemical apparatus for continuous reactions and the like, which apparatus may be provided with a seal housing, together with means in such housing for accommodating various types of seals in order to test the same under actual conditions of use.

A still further object of the invention is the provision of a chemical apparatus for continuous reactions and the like, including a plurality of chambers with impellers disposed in each chamber and with the walls of the chambers acting as heat exchange surfaces, the impellers being so formed as to move the product outwardly along one wall in a thin film and inwardly along the opposite wall in a thin film in order to facilitate heat transfer.

Another object of the invention is the provision of chemical apparatus for continuous reactions and the like, which apparatus may be mounted vertically in order to receive powdered or other types of dry material in a hopper and to mix such material with a vehicle prior to entry into the reactor chambers.

A further object of the invention is the provision of a chemical apparatus for continuous reactions, which apparatus may be mounted vertically and provided with a feed hopper in which solids or powdered materials may be thoroughly mixed with a vehicle introduced in the form of a spray prior to entry of the material or product into the reaction chambers thereby elimination cohesions of the grains of material at the inlet of the apparatus.

A still further object of the invention is the provision of a chemical apparatus for continuous reactions and the like, which apparatus may be mounted vertically and may be provided with a plurality of chambers with an impeller disposed in each chamber, the upper chamber being provided with a feeder impeller, the next lower chamber with a shear type impeller and the remainder of the chambers provided with mixing and pumping impellers.

Another object of the invention is the provision of a chemical apparatus for continuous reactions and the like, which apparatus may be conveniently disassembled for cleaning or repair.

Figure 11:
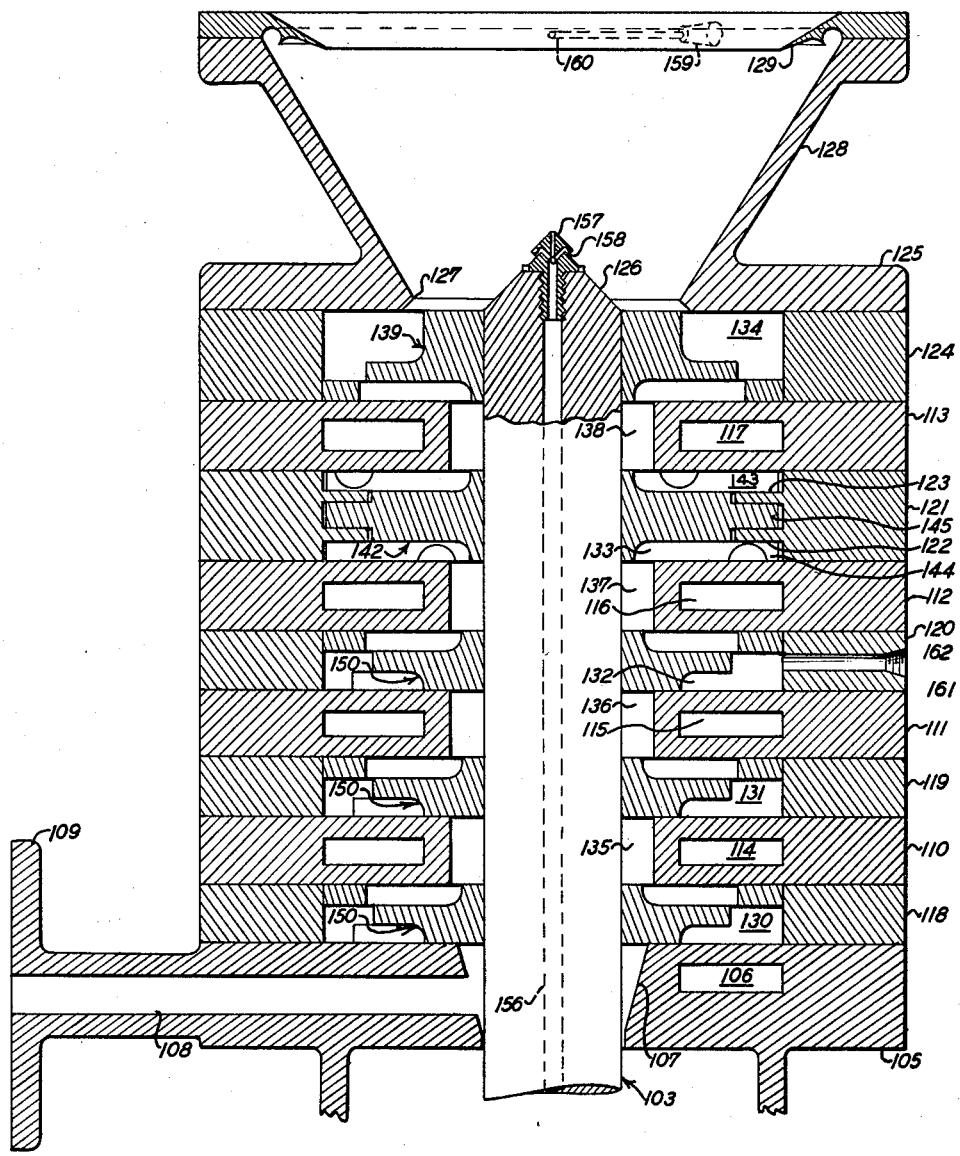

Further objects and advantages of the invention will be apparent from the following description taken in conjunction with the accompanying drawing wherein:

Fig. 1 is a side elevational view of an apparatus constructed in accordance with this invention;

Fig. 2 an end elevational view of the reactor portion of the apparatus;

Fig. 3 a transverse sectional view of the seal housing and showing one type of seal installed therein;

Fig. 4 a longitudinal sectional view of a reactor constructed in accordance with this invention;

Fig. 5 a sectional view taken substantially on the line 5—5 of Fig. 4;

Fig. 6 a view in perspective showing one of the impellers utilized in the reactor shown in Fig. 4;

Fig. 7 a fragmentary longitudinal sectional view showing a slightly modified form of reactor and incorporating a reactor chamber for releasing condensate vapor, together with a special impeller installed in the chamber and a condensate vapor accumulator tank;

Fig. 8 an end elevational view of the impeller utilized in the condensate vapor release chamber of Fig. 7;

Fig. 9 a side elevational view of the impeller shown in Fig. 8;

Fig. 10 a side elevational view of another form of the invention with the reactor installed in a vertical position;

Fig. 11 a longitudinal sectional view of the reactor portion of the apparatus shown in Fig. 10;

Fig. 12 an end elevational view of a feeder impeller utilized in the reactor shown in Fig. 11;

Fig. 13 a side elevational view of the impeller shown in Fig. 12;

Fig. 14 an end elevational view of a shear type impeller utilized in the apparatus shown in Fig. 11;

Fig. 15 a side elevational view of the impeller shown in Fig. 14;

Fig. 16 an end elevational view of a mixing and pumping impeller utilized in the apparatus of Fig. 11; and Fig. 17 a side elevational view of the impeller shown in Fig. 16.

With continued reference to the drawing and particularly Figs. 1 to 6 inclusive, there is shown an apparatus constructed in accordance with this invention and which may well comprise a base 10, a housing 11 mounted on the base 10 and providing a bracket 12 for supporting a drive motor 13. A variable speed transmission of any suitable type may be enclosed in the housing 11 and coupled to the motor 13 with a control handle 14 for varying the speed of the power output shaft 15 of the variable speed transmission.

An impeller drive shaft 16 may be rotatably mounted in suitable bearings in a supporting frame 17 mounted on the base 10 and the impeller drive shaft 16 is coupled to the power output shaft 15 by any suitable coupling means 18. The shaft supporting means 17 is provided with a flange 19 to which is secured a flange 20 provided on one end of a seal housing 21. The flange 20 may be secured to the flange 19 by screw threaded fastening means or the like 22.

As best shown in Fig. 3, the seal housing 21 may well comprise a generally cylindrical central portion 23 having the flange 20 at one end thereof and a flange 24 at the opposite end. The interior of the central portion 23 of the housing 21 is hollow and terminates in a shoulder 25 integral with the flange 24 and an annular recess 26 may be provided in the shoulder 25 adjacent the shaft 16. The recess 26 is provided for receiving various types of shaft seals in order to test the same in actual operation and as shown in Fig. 3, a chevron type seal 27 is positioned in the recess and a gland ring 28 engages the seal 27 with the gland ring 28 being adjustably secured in place by screw threaded fastening means or the like 29. A filler ring 30 is also positioned in the recess 26 and such filler ring may be removed as desired, in order to accommodate seals of different size or configuration. The flange 24 may be provided with an annular recess 31 in the outer face thereof adjacent the shaft 16 and communicating with the recess 31 is a material supply bore 32 in the flange 24 which termintes in a screw threaded opening 33 to which may be attached a suitable material supply conduit.

With particular reference to Fig. 4, the reactor portion of the apparatus may well comprise a plurality of axially spaced heat exchange plates 34, 35, 36 and 37 and as clearly shown, each of these plates is provided with an annular passage 38, 39, 40 and 41 for receiving a heat exchange fluid. Bores 42, 43, 44 and 45 commuicate with the passages 38, 39, 40 and 41 respectively and such bores are provided with threaded openings for receiving conduits 46, 47, 48 and 49. An outer end plate 50 is also provided having an annular passage 51 therein for receiving a heat exchange fluid and a bore 52 in the end plate 50 communicates with the passage 51 and is provided with means for attaching a conduit 53 thereto. The end plate 50 is also provided with an annular recess 54 on the inner surface and located centrally thereof and communicating with the recess 54 is a material discharge bore 55.

Spacer rings 56, 57 and 58 serve to separate the heat exchange plates 34, 35 and 36 while a spacer ring 59 serves to separate the inner heat exchange plate 37 from the flange 24 which forms an inner end plate and spacer ring 60 serves to separate the outer heat exchange plate 34 from the outer end plate 50.

It is to be noted, that the inner diameters of the spacer rings 56, 57, 58, 59 and 60 are greater than the inner diameters of the heat exchange plates, 34, 35, 36 and 37 which serves to provide impeller receiving chambers 61, 62, 63, 64 and 65 between the heat exchange plates and between the inner heat exchange plate 37 and the inner end plate or flange 24 and between the outer heat exchange plate 34 and the outer end plate 50. The shaft 16 projects through the flange or inner end plate 24 and is surrounded by the heat exchange plates and spacer rings and as shown in Fig. 4, the shaft 16 terminates within the annular recess 54 in the outer end plate 50 and the portion 66 of the shaft 16 between the inner end plate 24 and the outer end plate 50 is polygonal in cross section. The inner diameter of each of the heat exchange plates 34, 35, 36 and 37 is greater than the diameter of the polygonal portion 66 of the shaft 16 in order to provide annular material passages 67, 68, 69 and 70 between the impeller receiving chambers.

Impellers 71, 72, 73 and 74 and 75 are disposed in the impeller chambers 61, 62, 63, 64 and 65 respectively and as best shown in Figs. 5 and 6, each of these impellers may well comprise a set of radially extending vanes 76 curved in one direction and a second set of radially extending vanes 77 curved in the opposite direction. While the condensate vapor releasing and withdrawing portion of the apparatus is shown as installed adjacent the outer end plate 50, it is to be understood that this apparatus may be incorporated at any point along the reactor and that if desired, there may be a plurality of condensate vapor releasing impellers and accumulator tanks if such structure is necessary to the particular process being carried out.

A somewhat modified form of the invention is shown in Figs. 10 to 17 and such form may well comprise a base 96 which serves to support a drive motor 97 and a variable speed transmission 98 having a speed control handle 99 conveniently positioned thereon and as shown, the power output shaft 100 of the variable speed transmission 98 is disposed vertically.

A suitable frame 101 mounted on the base 96 serves to support a vertically disposed reactor 102 which is provided with an impeller shaft 103 coupled to the power output shaft 100 by a suitable coupling 104.

As best shown in Fig. 11, the impeller drive shaft 103 projects upwardly through a lower end plate 105 provided with a passage 106 therein for receiving a heat exchange fluid and also provided with an annular recess 107 adjacent the impeller drive shaft 103 communicating with a material discharge bore 108 provided at the outer end thereof with a flange coupling 109.

A plurality of axially spaced heat exchange plates 110, 111, 112 and 113 are disposed above the lower end plate 105 concentric with the shaft 103 and such heat exchange plates are provided with annular passages 114, 115, 116 and 117 for receiving a suitable heat exchange fluid. A spacer ring 118 separates the lower heat exchange plate 110 from the lower end plate 105 and similar spacer rings 119 and 120 separate the heat exchange plates 110, 111 and 112. A spacer ring 121 separates the heat exchange plates 112 and the upper heat exchange plate 113 and the spacer ring 121 is provided with inwardly extending annular ribs 122 and 123, the purpose of which will be presently described. The spacer ring 124 separates the upper heat exchange plate 113 and an upper end plate 125. The heat exchange plates spacer rings and upper and lower end plates may all be secured together as a unit by suitable fastening means, such as bolts extending therethrough, but for clarity of illustration, such fastening means are not shown in the drawing.

The portion of the drive shaft 103 projecting upwardly through the lower end plate 105 is polygonal in cross section and it is to be noted, that the upper end 126 of the shaft 103 projects upwardly through a central opening 127 in the upper end plate 125. Disposed on the upper end plate 125 is a feed hopper 128 communicating with the opening 127 in the upper end plate 125 and the hopper 128 is provided adjacent the upper end thereof with an inwardly extending overhanging lip 129, the purpose of which will be presently described.

As will be seen from an inspection of Fig. 11, the spacer rings 118, 119, 120, 121 and 124 are provided with inner diameters greater than the inner diameters of the heat exchange plates 110, 111, 112 and 113 in order to provide impeller receiving chambers 130, 131, 132, 133 and 134. In a similar manner, the inner diameters of the heat exchange plates 110, 111, 112 and 113 are greater than the diameter of the shaft 103 in order to provide annular material flow passages 135, 136, 137 and 138 between the impeller receiving chambers.

A feeder impeller 139 is disposed in the chamber 134 and as best shown in Figs. 12 and 13, such feeder impeller 139 may well comprise a plurality of radially extending helical vanes 140 which operate in the manner of a screw feed to move material from the hopper 128 through the chamber 134 and through the annular passage 138 to the chamber 133. The feeder impeller 139 is provided with a central polygonal aperture 141 for slidably and non-rotatably mounting the same on the polygonal portion of the shaft 103.

Disposed in the chamber 133 is a shear type impeller 142 and as best shown in Figs. 14 and 15, such impeller may well comprise spaced sets of radially extending relatively long vanes 143 and 144 and an intermediate set of relatively short vanes 145 with annular spaces 146 and 147 provided between the inner and outer sets of vanes 143 and 144 and the inner set of vanes 145. The outer sets of vanes 143 and 144 are provided in their side faces with transverse grooves 148 disposed at different radial distances from the center of the impeller 142. The impeller 142 is also provided with a central polygonal opening 149 for slidably and non-rotatably mounting the impeller on the polygonal portion of the shaft 103. As shown in Fig. 11, the impeller 142 is disposed in the chamber 133 with the inner and outer sets of vanes 143 and 144 disposed on the upper and lower sides of the inwardly extending annular ribs 122 and 123 and with the inner set of vanes 145 disposed between the ribs 122 and 123.

An impeller 150 is mounted in each of the chambers 130, 131 and 132 and as shown in Figs. 16 and 17, each impeller 150 may comprise a set of radially extending vanes 151 curved in one direction and a second set of radially extending vanes 152 curved in the opposite direction. The vanes 151 and 152 are separated by a disk 153 and the diameter of the disk 153 is less than the diameter of the vanes 151 and 152 in order to provide a material passage 154 between opposite sides of the disk 153. A central polygonal opening 155 is provided in the impeller 150 in order to slidably and non-rotatably mount the same on the polygonal portion of the shaft 103.

The shaft 103 may be provided with an axial passage 156 and disposed on the upper end 126 of the shaft 103 is a spray nozzle 157 having outwardly and downwardly directed jet orifices 158 communicating with the passage 156. A fluid inlet fitting 159 is provided on the hopper 128 adjacent the upper end thereof and a fluid outlet 160 opens into the hopper 128 below the lip 129 and directed tangentially of the hopper 128.

Also if desired, one of the spacer rings, such as the spacer ring 120 may be provided with a bore 161 communicating with the impeller chamber 132 and a threaded connection 162 may be provided on the outer end of the bore 161 to permit connection of a suitable conduit for supplying an additive to the chamber 132. The vanes 76 and 77 are separated by a disk 78 and it is to be noted, that the diameter of the disk 78 is materially less than the diameter of the vanes 76 and 77 in order to provide a material passage 79 from one side of the disk 78 to the other. Centrally of the impeller 71 there is provided a polygonal aperture 80 for slidably and non-rotatably mounting the impellers on the polygonal portion 66 of the shaft 16 and as shown in Fig. 4, the impellers are disposed in spaced relation according ot the spacing of the impeller chambers 61, 62, 63, 64 and 65.

The heat exchange plates, spacer rings and the outer end plate 50 are assembled in axial relationship and concentric with the polygonal portion 66 of the shaft 16 and all of these plates may be conveniently secured together and to the inner end plate or flange 24 by elongated screw threaded fastening means or the like 81 extending therethrough and provided at opposite ends with nuts 82 and 83 or with any other suitable fastening means. Consequently, it will be seen that merely by removing either of the nuts 82 or 83 and the fastening means 81 that the entire reactor portion of the apparatus may be conveniently disassembled for cleaning or repair purposes.

As shown in Fig. 4, the spacer ring 57 may be provided with a bore 84 communicating with the impeller chamber 63 with the bore 84 terminating in a threaded opening 85 for receiving a suitable conduit to supply an additive to the impeller chamber 63. While only one such additive supply bore is shown and described, it is to be understood that such a bore may be provided in each one of the impeller chambers or in selected ones of such chambers in order to supply additives wherever desired throughout the reaction process. The heat exchange fluid passages 38, 39, 40, 41 and 51 may be connected by conduits 86 and while as shown in Figs. 1 and 2, such passages are connected by these conduits in series, it is to be understood that any suitable connections may be employed in order that either a positive or a minus temperature may be obtained in the heat exchange fluid passages of each heat exchange plate and in this manner, the temperatures of the reaction at various points therein may be accurately determined and controlled.

In operation and with the impellers 71, 72, 73, 74 and 75 rotating at the desired speed, material is introduced to the reactor through the material supply bore 32 and the annular recess 31 in the inner end plate or flange 24 and such material is moved by the vanes 76 on the impeller 75 outwardly along the surface of the inner end plate 24. Such material then flows through the passage 79 to the opposite side of the disk 78 and is carried radially inwardly by the vanes 77 on the impeller 75. As such material is carried inwardly, the same moves in a thin film across the face of the heat exchange plate 37 and either gives up or receives heat from the heat exchange fluid present in the passage 41 of the heat exchange plate 37. From the vanes 77 of the impeller 75 the material flows through the annular passage 70 between the heat exchange plate 37 and the shaft 16 and is moved outwardly by the vanes 76 on the impeller 75 along the opposite face of the heat exchange plate 37 in a thin film to impart or receive heat therefrom. The material continues to flow through the entire reactor in the same manner from one side of the disk 78 of each impeller to the other until such time as the material reaches the recess 54 in the end plate 50, at which time the same is discharged through the material discharge bore 55. Due to the flow of the material in a thin film along the opposite faces of each impeller chamber, the temperature of the material in that chamber may be accurately controlled as desired, and furthermore additives may be introduced into one or more of the chambers through an additive supply bore 84 as fully described above. It will be noted, that the impellers disposed in the impeller chambers act to thoroughly agitate and mix the material and at the same time, operate as pump impellers in order to move the material through the reactor and since the amount of material moved therethrough is determined by the speed of operation of the impellers, such impellers operate as metering devices in order to control the quantity of material handled by the apparatus.

The apparatus as above described may be conveniently manufactured in relatively small sizes for laboratory use in order to determine the characteristics of a particular reaction or other chemical process and thereafter production apparatus may be constructed merely by duplicating the laboratory apparatus to an enlarged scale. It has been found that due to the design of the apparatus of this invention, that a production model of such apparatus will operate in the same manner as the laboratory apparatus and consequently, the proper design for the production apparatus may be accurately worked out and predicted in the laboratory.

In certain types of chemical processes involving continuous reactions, condensate vapor is released and must be withdrawn from the reactor and for this purpose there has been provided a structure as shown in Figs. 7 to 9, which may be incorporated in the reactor of this invention to permit withdrawal of such condensate vapors. As shown in Fig. 7, a relatively wide spacer ring 87 may be provided between the outer heat exchange plate 34 and the outer end plate 50 and a specially designed impeller 88 may be disposed in the chamber 89 provided by the heat exchange plate 34 and the outer end plate 50. Communicating with the chamber 89 is a fitting 90 to which may be connected an accumulator tank 91 for receiving condensate vapor released from the material in the chamber 89. The accumulator tank 91 may be provided with a discharge opening 92 and the tank 91 may be operated either under a positive pressure or under a vacuum.

As shown in Figs. 7 to 9, the impeller 88 may comprise a set of radially extending vanes 92 curved in one direction and a second set of radially extending vanes 93 curved in the opposite direction with the vanes 93 being of materially greater axial width than the vanes 92, as clearly shown in Figs. 7 and 9. A disk 94 separates the vanes 92 and 93 and as shown in Fig. 8, the diameter of the disk 94 is slightly less than the diameter of the vanes 92 and 93 to provide a restricted material passage 95 between opposite sides of the disk 94.

In operation, the material flowing through the reactor is moved outwardly along the outer wall of the heat exchange plate 34 by the vanes 92 and through the restricted material passage 95 in ripples which facilitates the release of condensate vapor through the fitting 90 to the accumulator tank 91. Due to the ripple flow of the material from one side of the disk 94 to the other, the release of condensate vapor is relatively rapid and consequently, there is no material loss of solids during this operation. Thereafter, the material is moved inwardly by the vanes 93 to the recess 54 in the end plate 50 for discharge through the material discharge bore 55.

Although only a single additive bore 161 is shown, it is to be understood that such means may be provided for supplying an additive to any number of the impeller chambers as required by the particular process being carried out.

In the operation of the above described form of the invention, granular or powdered material may be introduced into the hopper 128 and a suitable vehicle in the form of a liquid may be supplied under pressure through the fitting 159 and opening 160 to mix with the material and also such a vehicle may be sprayed from the orifices 158 of the nozzle 157 in such a manner as to thoroughly mix with the material and prevent cohesion of the particles thereof prior to entry into the reactor.

The material is fed from the hopper 128 through the opening 127 and into the chamber 134 where the same is fed by the impeller 139 through the passage 138 in the heat exchange plate 113 to the chamber 133 where the same is engaged and thoroughly by the shear type impeller 142. From the chamber 133 the material passes successively through the chambers 132, 131, and 130 and in these chambers the material flows along the opposite sidewalls of the chambers in a thin film from the inside to the outside and from the outside to the inside to facilitate heat transfer between the material and the heat exchange plates. In this manner, the reaction may be carried out under accurately controlled conditions and the material will be finally discharged through the material discharge bore 108 in the lower end plate 105.

It will be seen that by the above described invention there has been provided chemical apparatus which may be utilized to carry out various chemical processes under accurately controlled conditions and in which thorough and rapid mixing may be accomplished in order to facilitate such reactions and furthermore the apparatus may be conveniently manufactured for use in laboratories and thereafter duplicated to an enlarged scale for use in production.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. Chemical apparatus comprising a variable speed drive mechanism including a power output shaft, an impeller drive shaft coupled to said output shaft, a seal housing surrounding said drive shaft, an annular recess in said housing for receiving a drive shaft seal, a flange on one end of said housing providing an inner end plate, said drive shaft projecting through said flange and being provided exteriorly of said flange with a continuous polygonal cross section, an annular recess in said flange adjacent said drive shaft, a material supply bore in said flange communicating with said last named recess, a plurality of axially spaced heat exchange plates concentric with said drive shaft and an outer end plate, an annular passage in each heat exchange plate and said outer end plate for receiving a heat exchange fluid, spacer rings separating said heat exchange plates and spacer rings between the inner and outer heat exchange plates and the inner and outer end plates, the inner diameters of said rings being greater than the inner diameters of said heat exchange plates to provide impeller receiving chambers between adjacent heat exchange plates and between the inner and outer heat exchange plates and the inner and outer end plates, the inner diameters of said heat exchange plates being greater than the diameter of the polygonal portion of said drive shaft to provide an annular material passage between adjacent impeller chambers, an impeller disposed in each chamber, each impeller comprises a set of radially extending vanes curved in one direction and engaging one sidewall of the impeller chamber with a wiping contact, a second set of radially extending vanes curved in the opposite direction and engaging the opposite sidewall of the impeller chamber with a wiping contact and a disk separating said first and second sets of vanes, the outer diameter of said disk being less than the outer diameters of said sets of vanes to provide a material passage between opposite sides of said disk, whereby upon rotation of said impeller material will be moved outwardly along one sidewall of said impeller chamber in a thin film, through said passage and inwardly along the opposite sidewall of said impeller chamber in a thin film to agitate the material and facilitate heat transfer between the material and the sidewalls of the impeller chamber, each impeller having a central polygonal aperture for slidably and non-rotatably mounting the same on the polygonal portion of said drive shaft, the annular recess in said flange communicating with the inner impeller chamber, a central recess in the inner surface of said outer end plate communicating with the outer impeller chamber and a material discharge bore in said outer end plate communicating with said central recess.

2. Chemical apparatus as defined in claim 1 in which certain of said spacer rings are provided with an inlet passage communicating with the adjacent impeller chamber to permit introduction of a material additive to such chamber.

3. Chemical apparatus as defined in claim 1 in which said seal housing is provided with means for accommodating different types of seals in order to test such seals.

4. Chemical apparatus as defined in claim 1 in which certain of said impeller chambers are provided with a condensate vapor outlet passage, an accumulator tank communicating with said outlet passage and an impeller in said chamber, said impeller comprising a set of radially extending vanes curved in one direction and engaging one sidewall of the impeller chamber with a wiping contact, a second set of radially extending vanes curved in the opposite direction and engaging the opposite sidewall of the impeller chamber with a wiping contact and a disk separating said first and second sets of vanes, the outer diameter of said disk being slightly less than the outer diameters of said second sets of vanes to provide a restricted material passage between opposite sides of said disk, said second set of vanes being of materially greater axial width than said first set of vanes, said sets of vanes and said disk being of integral one-piece construction, whereby upon rotation of said impeller material will be moved outwardly along one sidewall of said impeller chamber in a thin film by said first set of vanes, through said material passage in ripples to release condensate vapor through said outlet passage and inwardly along the opposite sidewall of said impeller chamber in a thin film to agitate the material and facilitate heat transfer between the material and the sidewalls of the impeller chamber.

5. Chemical apparatus as defined in claim 1 in which certain of said impeller chambers are provided with a condensate vapor outlet passage, an accumulator tank communicating with said outlet passage and an impeller in said chamber, said impeller comprising a set of radially extending vanes curved in one direction and engaging one sidewall of the impeller chamber with a wiping contact, a second set of radially extending vanes curved in the opposite direction and engaging the opposite sidewall of the impeller chamber with a wiping contact and a disk separating said first and second sets of vanes, the outer diameter of said disk being slightly less than the outer diameters of said sets of vanes to provide a restricted material passage between opposite sides of said disk, said second set of vanes being of materially greater axial width than said first set of vanes, whereby upon rotation of said impeller material will be moved outwardly along one sidewall of said impeller chamber in a thin film by said first set of vanes, through said material passage in ripples to release condensate vapor through said outlet passage and inwardly along the opposite sidewall of said impeller chamber in a thin film to agitate the material and facilitate heat transfer between the material and the sidewalls of the impeller chamber.

6. Chemical apparatus as defined in claim 1 in which certain of said impeller chambers are provided with a condensate vapor outlet passage and an impeller in said chamber, said impeller comprising a set of radially extending vanes curved in one direction and engaging one sidewall of the impeller chamber with a wiping contact, a second set of radially extending vanes curved in the opposite direction and engaging the opposite sidewall of the impeller chamber with a wiping contact and a disk separating said first and second sets of vanes, the outer diameter of said disk being slightly less than the outer diameters of said sets of vanes to provide a restricted material passage between opposite sides of said disk, said second set of vanes being of materially greater axial width than said first set of vanes, thereby upon rotation of said impeller material will be moved outwardly along one sidewall of said impeller chamber in a thin film by said first set of vanes, through said material passage in ripples to release condensate vapor through said outlet passage and inwardly along the opposite sidewall of said impeller chamber in a thin film to agitate the material and facilitate heat transfer between the material and the sidewalls of the impeller chamber.

7. Chemical apparatus as defined in claim 1 in which certain of said impeller chambers are provided with a condensate vapor outlet passage and an impeller in said chamber, said impeller comprising a set of radially extending vanes curved in one direction and engaging one sidewall of the impeller chamber with a wiping contact, a second set of radially extending vanes curved in the opposite direction and engaging the opposite sidewall of the impeller chamber with a wiping contact and a disk separating said first and second sets of vanes, the outer diameter of said disk being slightly less than the outer diameters of said sets of vanes to provide a restricted material passage between opposite sides of said disk, whereby upon rotation of said impeller material will be moved outwardly along one sidewall of said impeller chamber in a thin film by said first set of vanes, through said material passage in ripples to release condensate vapor through said outlet passage and inwardly along the opposite sidewall of said impeller chamber in a thin film to agitate the material and facilitate heat transfer between the material and the sidewalls of the impeller chamber.

8. Chemical apparatus as defined in claim 1 in which certain of said impeller chambers are provided with a condensate vapor outlet passage and an impeller in said chamber, said impeller comprising a set of radially extending vanes curved in one direction and engaging one sidewall of the impeller chamber with a wiping contact, a second set of radially extending vanes curved in the opposite direction and engaging the opposite sidewall of the impeller chamber with a wiping contact and a disk separating said first and second sets of vanes, the outer diameter of said disk being less than the outer diameters of said sets of vanes to provide a material passage between opposite sides of said disk, whereby upon rotation of said impeller material will be moved outwardly along one sidewall of said impeller chamber in a thin film by said first set of vanes, through said material passage to release condensate vapor through said outlet and inwardly along the opposite sidewall of said impeller chamber in a thin film to agitate the material and facilitate heat transfer between the material and the sidewalls of the impeller chamber.

9. Chemical apparatus comprising a variable speed drive mechanism including a power output shaft, a vertical impeller drive shaft coupled to said output shaft, a lower end plate, said drive shaft projecting through said lower end plate and being provided exteriorly with said lower end plate with a continuous polygonal cross section, an annular recess in the upper surface of said lower end plate adjacent said drive shaft, a material discharge bore in said lower end plate communicating with said recess, a plurality of axially spaced heat exchange plates concentric with said drive shaft and an upper end plate having a central opening, an annular passage in each heat exchange plate and said lower end plate for receiving a heat exchange fluid, spacer rings separating said heat exchange plates and spacer rings between the upper and lower heat exchange plates and the upper and lower end plates, the inner diameters of said rings being greater than the inner diameters of said heat exchange plates to provide impeller receiving chambers between adjacent heat exchange plates and between the upper and lower heat exchange plates and the upper and lower end plates, the inner diameters of said heat exchange plates being greater than the polygonal portion of said drive shaft to provide an annular material passage between adjacent impeller chambers, a feeder impeller disposed in the upper chamber with the end surfaces of said impeller engaging the upper and lower end walls of the chamber with a wiping contact, spaced inwardly projecting annular ribs on the sidewall of the next lower chamber, a shear type impeller disposed in said next lower chamber, said last named impeller having radial vanes engaging the upper and lower end surfaces of said next lower chamber and the upper and lower surfaces of said ribs with a wiping contact, mixing impellers disposed in the remainder of the chambers with the end faces of each of said last named impellers engaging the upper and lower end walls of said remaining chambers, each impeller having a central and polygonal aperture for slidably and non-rotatably mounting the same on the polygonal side of said drive shaft, a feed hopper on said upper end plate communicating with said central opening, an axial bore in said drive shaft, said drive shaft projecting through said central opening into said hopper, a spray nozzle on the upper end of said drive shaft communicating with said axial bore and having downwardly and outwardly directed jet orifices and inwardly extending overhanging lip in said hopper and a fluid inlet opening below said lip directed tangentially of said hopper.

10. Chemical apparatus as defined in claim 9 in which certain of said spacer rings are provided with an inlet passage communicating with the adjacent impeller chamber to permit introduction of a material additive to such chamber.

11. Chemical apparatus as defined in claim 9 in which said feeder impeller comprises a plurality of radially extending helical vanes.

12. Chemical apparatus as defined in claim 9 in which said shear type impeller comprises spaced outer sets of relatively long radial vanes, an intermediate set of relatively short radial vanes disposed between said annular ribs and transverse grooves in the upper and lower side faces of said outer sets of vanes, said grooves being disposed at different distances from the axis of the impeller and said impeller being of integral one-piece construction.

13. Chemical apparatus as defined in claim 9 in which said shear type impeller comprises spaced outer sets of relatively long radial vanes, an intermediate set of relatively short radial vanes disposed between said annular ribs and transverse grooves in the upper and lower side faces of said outer sets of vanes, said grooves being disposed at different distances from the axis of the impeller.

14. Chemical apparatus as defined in claim 9 in which said shear type impeller comprises spaced outer sets of relatively long radial vanes and an intermediate set of relatively short radial vanes disposed between said annular ribs.

15. Chemical apparatus as defined in claim 9 in which said shear type impeller comprises spaced outer sets of radial vanes and an intermediate set of radial vanes disposed between said annular ribs.

16. Chemical apparatus comprising a vertical impeller drive shaft, a lower end plate, said drive shaft projecting through said lower end plate and being provided with a polygonal cross section, an annular recess in the upper surface of said lower end plate adjacent said drive shaft, a material discharge bore in said lower end plate communicating with said recess, a plurality of axially spaced heat exchange plates concentric with said drive shaft and an upper end plate having a central opening, an annular passage in each heat exhcange plate and said lower end plate for receiving a heat exchange fluid, spacer rings separating said heat exchange plates and spacer rings between the upper and lower heat exchange plates and the upper and lower end plates, the inner diameters of said rings being greater than the inner diameters of said heat exchange plates to provide impeller receiving chambers between adjacent heat exchange plates and between the upper and lower heat exchange plates and the upper and lower end plates, the inner diameters of said heat exchange plates being greater than the polygonal portion of said drive shaft to provide an annular material passage between adjacent impeller chambers, a feeder impeller disposed in the upper chamber with the end surfaces of said impeller engaging the upper and lower end walls of the chamber with a wiping contact, spaced inwardly projecting annular ribs on the sidewall of the next lower chamber, a shear type impeller disposed in said next lower chamber, said last named impeller having radial vanes engaging the upper and lower end surfaces of said next lower chamber and the upper and lower surfaces of said ribs with a wiping contact, mixing impeller disposed in the remainder of the chambers with the end faces of each of said last named impellers engaging the upper and lower end walls of said remaining chambers, each impeller having a central polygonal aperture for slidably and non-rotatably mounting the same on the polygonal portion of said drive shaft, a feed hopper on said upper end plate communicating with said central opening, an axial bore in said drive shaft, said drive shaft projecting through said central opening into said hopper, a spray nozzle on the upper end of said drive shaft communicating with said axial bore, an inwardly extending overhanging lip on said hopper and a fluid inlet opening below said lip directed tangentially of said hopper.

17. Chemical apparatus comprising a vertical impeller drive shaft, a lower end plate, said drive shaft projecting through said lower end plate, a plurality of axially spaced heat exchange plates concentric with said drive shaft and an upper end plate having a central opening, an annular passage in each heat exchange plate and said lower end plate for receiving a heat exchange fluid, spacer rings separating said heat exchange plates and spacer rings between the upper and lower heat exchange plates and the upper and lower end plates, the inner diameters of said rings being greater than the inner diameter of said heat exchange plates to provide impeller receiving chambers between adjacent heat exchange plates and between the upper and lower heat exchange plates and the upper and lower end plates, the inner diameters of said heat exchange plates being greater than said drive shaft to provide an annular material passage between adjacent impeller chambers, a feeder impeller disposed in the upper chamber with the end surfaces of said impeller engaging the upper and lower end walls of the chamber with a wiping contact, spaced inwardly projecting annular ribs on the sidewall of the next lower chamber, a shear type impeller disposed in next lower chamber, said last named impeller having radial vanes engaging the upper and lower end surfaces of said next lower chamber and the upper and lower surface of said ribs with a wiping contact, mixing impellers disposed in the remainder of the chambers with the end faces of each of said last named impellers engaging the upper and lower end walls of said remaining chambers, each impeller being non-rotatably mounted on said drive shaft, a feed hopper on said upper end plate communicating with said central opening, an axial bore in said drive shaft, said drive shaft projecting through said central opening into said hopper, a spray nozzle on the upper end of said drive shaft communicating with said axial bore and a material discharge bore in said lower end plate communicating with the lower impeller chamber.

18. Chemical apparatus comprising a vertical impeller drive shaft, a lower end plate, said drive shaft projecting through said lower end plate, a plurality of axially spaced heat exchange plates surrounding said drive shaft and an upper end plate having a central opening, a passage in each heat exchange plate and said lower end plate for receiving a heat exchange fluid, spacer rings separating said heat exchange plates and spacer rings between the upper and lower end plates and the upper and lower heat exchange plates, the inner diameters of said rings being greater than the inner diameters of said heat exchange plates to provide impeller receiving chambers between adjacent heat exchange plates and between the upper and lower heat exchange plates and the upper and lower end plates, a material passage between adjacent impeller chambers, a feeder impeller disposed in the upper chamber with the end surfaces of said impeller engaging the upper and lower end walls of the chamber with a wiping contact, spaced inwardly projecting annular ribs on the sidewall of the next lower chamber, a shear type impeller disposed in said next lower chamber, said last named impeller having radial vanes engaging the upper and lower end surfaces of said next lower chamber and the upper and lower surfaces of said ribs with a wiping contact, mixing impellers disposed in the remainder of the chambers with the end faces of each of said last named impellers engaging the upper and lower end walls of said remaining chambers, each impeller being non-rotatably mounted on said drive shaft, a feed hopper on said upper end plate communicating with said central opening and a material discharge bore in said lower end plate communicating with the lower impeller chamber.

References Cited in the file of this patent
UNITED STATES PATENTS

| | | |
|---|---|---|
| 1,375,210 | Clayton et al. | Apr. 19, 1921 |
| 2,050,654 | Gerstenberg | Aug. 11, 1936 |
| 2,169,338 | Ditto | Aug. 15, 1939 |
| 2,538,466 | Marco | Jan. 16, 1951 |
| 2,614,910 | Allen et al. | Oct. 21, 1952 |